UNITED STATES PATENT OFFICE.

JOHN RIDER, OF NEW YORK, N. Y.

IMPROVEMENT IN PROCESSES OF MANUFACTURING GUTTA-PERCHA.

Specification forming part of Letters Patent No. 8,992, dated June 1, 1852.

*To all whom it may concern:*

Be it known that I, JOHN RIDER, of the city, county, and State of New York, have invented a new Process of Treating Gutta-Percha by which it is made capable of being perfectly vulcanized, and also a new process of vulcanizing or metallothyanizing the gutta-percha when it has been prepared by my said preliminary treatment; and I do hereby declare that the following is a full and exact description thereof.

My invention is intended to obviate the difficulties which have heretofore been found to oppose all attempts to make good and durable articles of metallothyanized gutta-percha. Those difficulties have arisen in a great measure, as I believe, from an erroneous conception that gutta-percha is identical in constitution and character with gum-elastic, and that every operation in the process of vulcanizing this last-named material might be applied to the treatment of gutta-percha. Among the properties in which I find the two materials to be essentially different is that of their behavior under the influence of heat, and as this difference is most important in vulcanizing the two substances I have directed special attention to it in the several steps or stages of my process.

In its raw state gutta-percha, besides being generally mixed with various woody or other foreign impurities, is unfit to be immediately mixed with sulphur or sulphur compounds, in consequence of its possessing within its substance certain volatilizable ingredients of a nature to interfere with its assuming, after mixture, a compact and permanently elastic consistence. As it is essential to the success of the vulcanizing process to get rid of those solid impurities which would break the continuity of the mass, so it is in the case of gutta-percha necessary to expel the volatilizable ingredients, whether water, the elements of water, or volatile oils or acids which are contained in the crude material. In my mode of treating gutta-percha it is not material whether the volatile ingredients are expelled before or after the solid impurites are removed, though in general I prefer to remove the foreign materials before proceeding to the regular steps of my improved process. The first of these steps is to prepare the gutta-percha for treatment with the proper sulphur compound. It consists in heating the gum by itself—that is, without the presence of either sulphur or sulphur compounds—to such a temperature as will generally reduce it to the consistence of a thin dough or batter, which temperature will not ever need to exceed 400° or 450°. In some samples of gutta-percha this preliminary heating may be less than 300°. The time occupied in this heating must depend on temperature employed as well as the quantity and the state of aggregation of the material when the heating is commenced. It must be sufficient to give a nearly uniform temperature throughout. From two to four hours will generally be sufficient. The heat may be applied by hot rollers, or by any other well-known means of giving promptly a regulated temperature to the gutta-percha, and the heating may be either by steam or hot air, though the latter is preferred. The gutta-percha, if not previously freed from the impurities mechanically mixed with it, may now be cleaned after cooling sufficiently; but I prefer the cleansing process to precede the heating, since the latter gives greater compactness to the gum than it possessed in the raw state, and the woody material or bark is not so easily separated as before the high temperature is applied.

Second. To every eight pounds, or thereabout, of the prepared gutta-percha I apply three pounds of hyposulphite of lead or zinc, and mix or incorporate the same thoroughly with the gutta-percha by passing the mixture through a series of heated metallic rolls in a manner similar to that practiced in mixing sulphur, &c., with india-rubber, with the exception that in this case the rolls are heated to a lower point by some twenty or thirty degrees than in mixing gum-elastic with its vulcanizing materials. In cases where it is desirable to give solidity or body to the goods there may, besides the hyposulphite of lead or of zinc, be added to the above-mentioned weight of gutta-percha about four pounds of Paris white or whiting and one pound of magnesia. When thoroughly incorporated by the mixing operation the compound is ready to be spread upon cloth formed into sheets or molded into any other shape; but it is still liable to be affected by changes of climate and by solvents equally as much as native gutta-percha. To prevent this and to render the articles permanently elastic at all temperatures they are submitted to a curing operation.

Third. This operation is analogous to that for curing india-rubber goods, with the exception hereinafter specified. The articles are placed in a room or vessel as nearly air-tight as conveniently may be, and are subjected to a heat of from 280° to 320° Fahrenheit. This heat is higher than is used for curing india-rubber. The time required for curing will vary from two to ten hours, according to the massiveness of the articles, the thicker and heavier pieces requiring a longer time to become fully penetrated by the heat than thinner and lighter goods. Articles liable to come in contact with each other during the time of curing should be dusted over with flour or other like non-adherent powder to prevent their cohering together. After the curing operation is completed the goods are withdrawn, washed clean with water, and dried, when they are ready for use. If required to be entirely free from odor, they will, instead of merely washing with water, be boiled in a strong solution of potash, then well washed in water and dried in the sun.

The hyposulphites and other materials herein specified as being mixed and incorporated with gutta-percha are sometimes advantageously employed, in combination with metallic sulphurets, for metallothyanizing gutta-percha. In these cases preference is to be given to those artificial sulphurets which have resulted from precipitation on account of their being in a state of minute subdivision capable of intimate incorporation with the hyposulphite and other ingredients of the gutta-percha mixture.

From the statements and directions herein given it will be understood that my process, besides the variations of temperature in the mixing and curing operations from those which are employed in analogous operations in the treatment of india-rubber, embraces a preliminary operation or step of the process which is neither necessary nor useful in vulcanizing india-rubber, but which would, on the contrary, destroy it by rendering it unfit for vulcanizing.

Though gutta-percha is capable of bearing the very high temperature of my preliminary operation, yet after as well as before that operation has been performed upon it it softens sufficiently at lower degrees of the scale to permit the mixing to be performed at a less elevated temperature than india-rubber requires in the mixing, and the lower temperature at which I mix has the advantage of preventing adhesion to the rolls, especially in the early stages of the operation; but though mixed at a lower temperature than is demanded for gum-elastic, the vulcanized gutta-percha admits and requires in the third or curing operation a higher temperature than can be safely applied in curing india-rubber. If not thus heated, the chemical combination between the gutta-percha and the vulcanizing materials will not be complete and durable.

Having thus described my invention, what I claim as new, and desire to secure by Letters Patent, is—

1. The preparing of gutta-percha for vulcanizing by a preliminary separate heating of it to such a degree as to expel its volatile ingredients herein specified, which I find can generally be effected at the high temperatures from 285° to 430° Fahrenheit, substantially as herein set forth.

2. The process herein described of vulcanizing gutta-percha by first heating it to a sufficiently high temperature to expel from it the volatile ingredients herein specified, which it is believed can be accomplished between 285° and 430° Fahrenheit, and then incorporating with it, substantially as herein specified, a hyposulphite, either alone or in combination with metallic sulphurets or whiting or magnesia, or with all of them together, and then subjecting the mixture to a temperature of from 285° to 320° Fahrenheit, all the steps of the said process being performed subtantially in the manner herein set forth, at the same time desiring it to be understood that I disclaim the vulcanizing of gutta-percha in all cases save when it has been prepared for the vulcanizing operation by the aforesaid preliminary heating.

JOHN RIDER.

Witnesses:
STEPHEN EDDY,
L. S. SMITH.